May 9, 1944.　　　　K. PERKINS　　　　2,348,684
BRUSH HOLDER FOR DYNAMO ELECTRIC MACHINES
Filed March 11, 1942
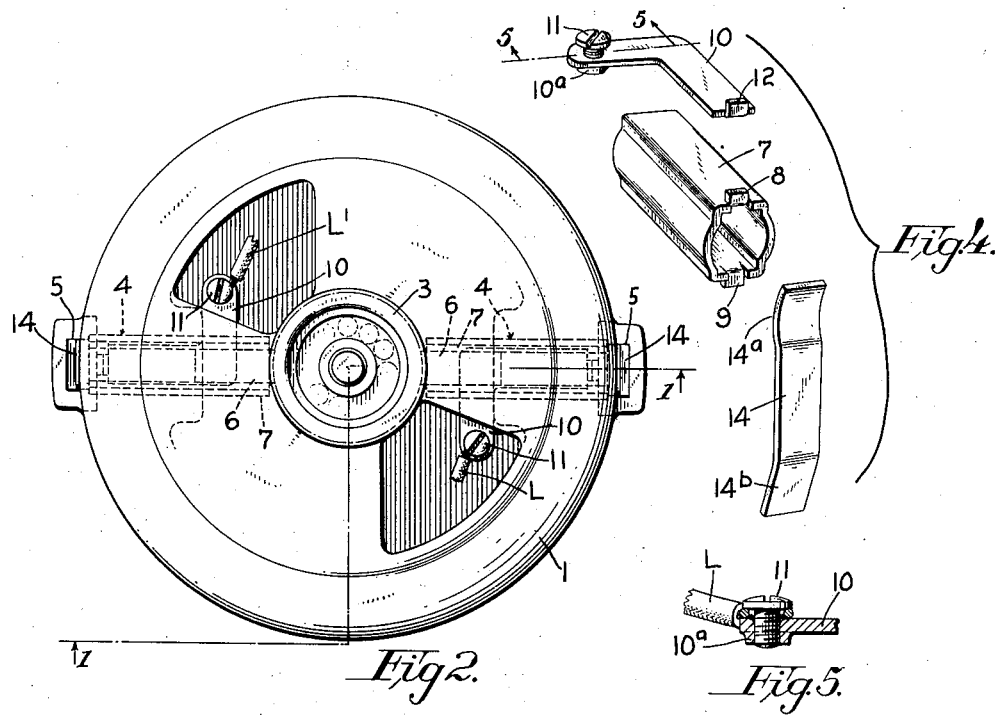
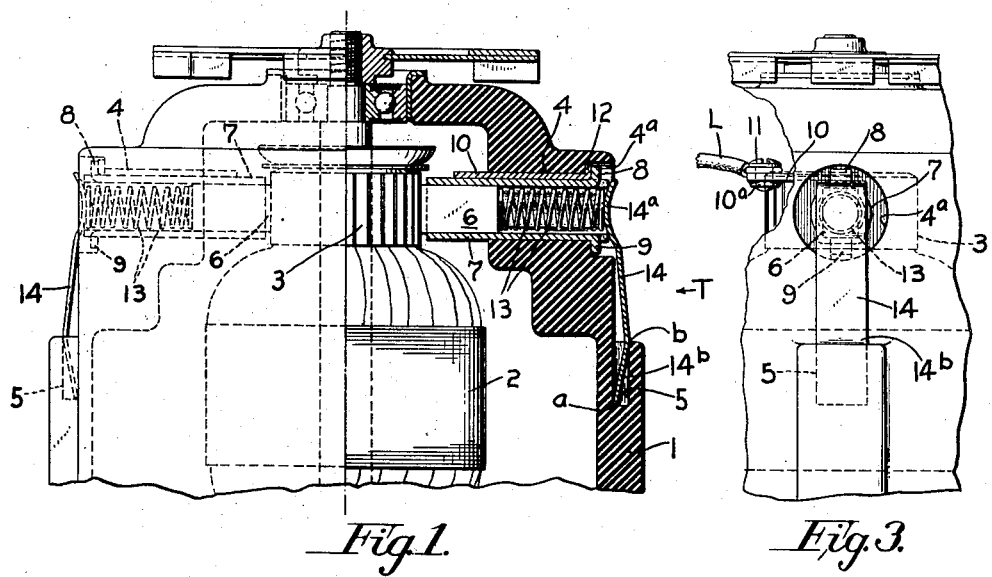
Inventor
Kenneth Perkins
Witness:
John H. Cave
By John F. Heme
Attorney Patented May 9, 1944

2,348,684

UNITED STATES PATENT OFFICE 2,348,684

BRUSH HOLDER FOR DYNAMOELECTRIC MACHINES

Kenneth Perkins, Scotch Plains, N. J., assignor to The Singer Manufacturing Company, Elizabeth, N. J., a corporation of New Jersey Application March 11, 1942, Serial No. 434,243

8 Claims. (Cl. 171—324)

This invention relates to brush holders for dynamoelectric machines and it has as its primary object to provide an improved brush holder which may be made of a minimum number of parts, each of which, in turn, may be made by simple operations upon stock material which is readily available.

Another object of the invention is to provide an improved brush holder which may be made of a minimum number of simple constructed parts; which readily may be incorporated in the machine for which it is adapted; and which may be held in its operative position in such machine without the aid of any other attaching means.

A further object of the invention is to provide an improved brush holder particularly adapted for use in a dynamoelectric machine having a casing of moulded material which, in its process of manufacture, may be formed with appropriate sockets for receiving and holding the brush holder.

With the above and other objects in view, as will hereinafter appear, the invention comprises the devices, combinations and arrangements of parts hereinafter set forth and illustrated in the accompanying drawing of a preferred embodiment of the invention, from which the several features of the invention and the advantages attained thereby will be readily understood by those skilled in the art.

In the drawing,

Fig. 1 is a side elevation, partly in section, on the line 1—1 of Fig. 2, of a portion of a dynamoelectric machine embodying the present invention.

Fig. 2 is a plan view of the machine illustrated in Fig. 1.

Fig. 3 is a detail side elevation of a portion of the machine illustrated in Fig. 1, the view being taken looking in the direction indicated by the arrow T.

Fig. 4 is a disassembled perspective view of elements of the improved brush holder.

Fig. 5 is an enlarged detail sectional view on the line 5—5 of Fig. 4.

Referring more specifically to the drawing, the invention is disclosed as embodied in a dynamoelectric machine comprising a casing 1 of moulded material, such for example as rubber, "Bakelite" or other phenolic condensation product, a rotor 2 journaled in said casing, and a commutator 3 forming a part of said rotor. In moulding the casing 1, two diametrically opposed bores 4, having enlarged outer ends 4ª, and two longitudinally disposed pockets 5 are formed therein. The bores 4, 4ª are adapted to receive the improved brush holders and the pockets 5 to receive brush holder retaining elements, as hereinafter will be described. Inasmuch as other structural characteristics of the dynamoelectric machine, apart from the brush and brush holder, constitute no part of this invention and may be of conventional form, detailed illustration and description thereof is deemed unnecessary.

Cooperating with the commutator 3 are a pair of brushes 6, of carbon or other suitable material. These brushes are each slidingly mounted in one of my improved brush holders comprising a flattened metallic tube 7 fitted within one of the moulded bores 4 in the machine casing 1. Upper and lower tangs 8 and 9 are struck from the flattened walls of the tube 7, at the breech end thereof, and extend into the enlarged outer end 4ª of the bore 4. Of these, the lower tang 9 abuts against a wall of the casing 1 and limits the inward movement of the tube. Fitted within the bore 4 above and in contact with the upper surface of the tube 7 is an L-shaped electrical contact plate 10 having one end punched downwardly at 10ª and internally threaded to receive a terminal screw 11 to which is connected one of the electric conductors L or L¹. The other end of the contact plate 10 is formed with an upstanding tang 12 adapted to bear upon the casing 1 and to be engaged by the rear face of the tang 8 on the tube 7. Thus the plate 10 is held against endwise movement in either direction.

Mounted in each brush tube 7 is a coil spring 13 which is maintained under compression and which has one end bearing against the rear end of the brush 6 to hold the opposite end of the brush in contact with the commutator. The opposite end of the spring bears upon the convex face 14ª of the upper end of a bowed and resilient retaining member 14 which has its lower end 14ᵇ fitted within one of the pockets 5 formed in the casing 1. The upper end of the retaining member 14 also engages the outer end of the brush tube 7 and holds the tube in the bore 4. The resilient retaining member 14 is preferably made of sheet metal and is placed under tension when it is inserted in the pocket 5 and maintained under tension by reason of its contact with the outer end of the brush tube and with the casing 1 at the points a and b at opposite ends of the pocket 5.

In assembling the parts in operative position, that arm of the contact plate 10 having the tang 12 is inserted into the bore 4 from the inside of the casing until the tang lies within the outer end 4ᵃ of the bore. Next, the brush tube 7 is inserted into the bore 4, from the outside, until its tang 8 contacts the tang 12 of the contact plate. The brush 6 and spring 13 are next inserted into the brush tube through the breech end and finally the resilient retaining member 14 is inserted, under tension, into the pocket 5 and the upper end thereof snaps into contact with the brush tube, thereby constantly urging that element inwardly in the casing 1. It will be noted that no tools or attaching elements are required to assemble the brush holder in the casing 1 or to maintain it in its operative position therein.

Likewise it will be noted that the improved brush holder comprises only three elements 7, 10 and 14, all of which are made from readily obtainable stock material; the brush tube 7 being made from a form of tubing which is readily available and the elements 10 and 14 being punched from flat stock. The terminal screw 11 also is a stock article.

It will also be apparent that the present brush holders will afford good conduction of electricity from the conductors L and L¹ to the brushes 6, inasmuch as the contact plates 10, to which the conductors are connected, are in surface-to-surface contact with the brush tubes 7 which, in turn, are electrically connected with the brushes 6 by direct contact therewith and also through the members 14 and coil springs 13.

Having thus set forth the nature of the invention what I claim herein is:

1. A brush and brush holder assembly for a dynamoelectric machine having a casing provided with a radial bore and a longitudinal pocket, comprising a metallic tube in said bore, said tube having a tang engaging said casing to position the tube therein, a sheet metal contact plate having one portion in said bore in contact with said tube and another portion carrying an electric terminal, said plate having a tang engaging said casing to position said plate relative thereto, a brush slidingly mounted in the inner end of said tube, a coil spring behind and in contact with said brush, and a sheet metal retaining element having one end inserted in said pocket and its other end engaging the outer end of said tube and said coil spring.

2. A brush and brush-holder for a dynamoelectric machine having a casing provided with a radial bore and a longitudinal pocket, comprising a flattened tube in the bore in said casing, a spring-pressed brush in said tube, a sheet metal electrical contact element in said bore in engagement with the flattened side of said tube, and a sheet metal retainer element having one end thereof secured within said pocket and another end engaging the end of said tube to hold it in said bore and to take the thrust of the brush-actuating spring.

3. A brush and brush-holder for a dynamoelectric machine having a casing provided with a longitudinal pocket and a radial bore having an enlarged outer end, comprising a tube in the bore in said casing, a spring-pressed brush in said tube, a pair of oppositely projecting tangs on the outer end of said tube, a sheet metal electrical contact element having an offset tang in said bore in engagement with said tube, with the tang seated in the enlarged outer end of said bore, and a sheet metal retainer element having one end fitted within said pocket and another end engaging the end of said tube to hold it in said bore with one of its tangs in engagement with the casing and its other tang in engagement with the tang of said contact element and taking the thrust of the brush-actuating spring.

4. In a dynamoelectric machine having a casing and a commutator journaled therein, said casing being provided with a radial bore and a longitudinal pocket; means for making electrical contact from an electrical conductor in said casing to said commutator, comprising a contact plate located in said bore and to which said conductor is connected, a tube fitted within said bore in engagement with said contact plate, a brush slidingly mounted in said tube, a spring in said tube behind said brush, and a retaining member having one end held in said pocket and its other end in contact with said tube and spring to hold the tube in said bore and to hold said brush in yielding contact with said commutator.

5. In a dynamoelectric machine having a casing and a commutator journaled therein, said casing being provided with a radial bore and a longitudinal pocket; a contact plate located in said bore and to which an electric conductor is connected, a tube fitted within said bore in engagement with said contact plate, a bowed sheet metal retaining member having one end frictionally held in said pocket and its other end in pressure contact with said tube to hold the tube in said bore, and a spring-pressed brush in said tube.

6. In a dynamoelectric machine having a casing and a commutator journaled therein, said casing being provided with a radial bore and a longitudinal pocket; a substantially L-shaped sheet-metal contact plate having one leg located in said bore, an electric terminal carried by the other leg of said contact plate and to which an electric conductor is connected, a tube fitted within said bore in engagement with said contact plate, a brush slidingly mounted in said tube, a spring in said tube behind said brush, and a bowed sheet metal retaining member having one end frictionally held in said pocket and its other end in pressure contact with said tube and spring to hold the tube in said bore and to hold said brush in yielding contact with said commutator.

7. In a dynamoelectric machine having a casing and a commutator journaled therein, said casing being provided with a radial bore and a longitudinal pocket; means for making electrical contact from an electrical conductor to said commutator, comprising a contact plate located in said bore and to which said electrical conductor is connected, a brush tube fitted within said bore in electrical contact with said contact plate, said tube having an open breech end remote from the commutator, a brush slidingly mounted in said tube, a compressed spring in said tube behind said brush, and a resilient retaining member having one end frictionally held in said pocket and its other end in pressure contact with the breech end of said tube and with said compressed coil spring to hold the tube in said bore and to hold said brush in yielding contact with said commutator.

8. In a dynamoelectric machine having a casing and a commutator journaled therein, said casing being provided with a radial bore and a longitudinal pocket; means for making electrical contact from an electrical conductor to said commutator, comprising a contact plate located in said bore and to which said electrical conductor is connected, a brush tube fitted within said bore in electrical contact with said contact plate, said tube having an open breech end remote from the commutator, a brush slidingly mounted in said tube, a compressed spring in said tube behind said brush, and a bowed resilient retaining member having one end inserted in said pocket and its other end in pressure contact with the breech end of said tube to hold said tube in said casing and to provide an abutment for said spring, said retaining member being held in its operative position solely by its contacts with the opposite walls of said pocket and with said tube.

KENNETH PERKINS.